(No Model.)

3 Sheets—Sheet 1.

F. VIDAL Y VILARET & D. BELAIS.
ELECTRIC MOTOR REGULATOR.

No. 592,619.

Patented Oct. 26, 1897.

WITNESSES:
Gustave Dieterich
John Kehlenbeck

INVENTORS
Felipe Vidal y Vilaret
David Belais
BY
Jack Benjamin
their ATTORNEY.

(No Model.) 3 Sheets—Sheet 2.

F. VIDAL Y VILARET & D. BELAIS.
ELECTRIC MOTOR REGULATOR.

No. 592,619. Patented Oct. 26, 1897.

WITNESSES:
Gustave Dieterich
John Kehlenbeck

INVENTORS
Felipe Vidal y Vilaret
David Belais
BY
Park Benjamin
Their ATTORNEY.

(No Model.) 3 Sheets—Sheet 3.
F. VIDAL Y VILARET & D. BELAIS.
ELECTRIC MOTOR REGULATOR.
No. 592,619. Patented Oct. 26, 1897.
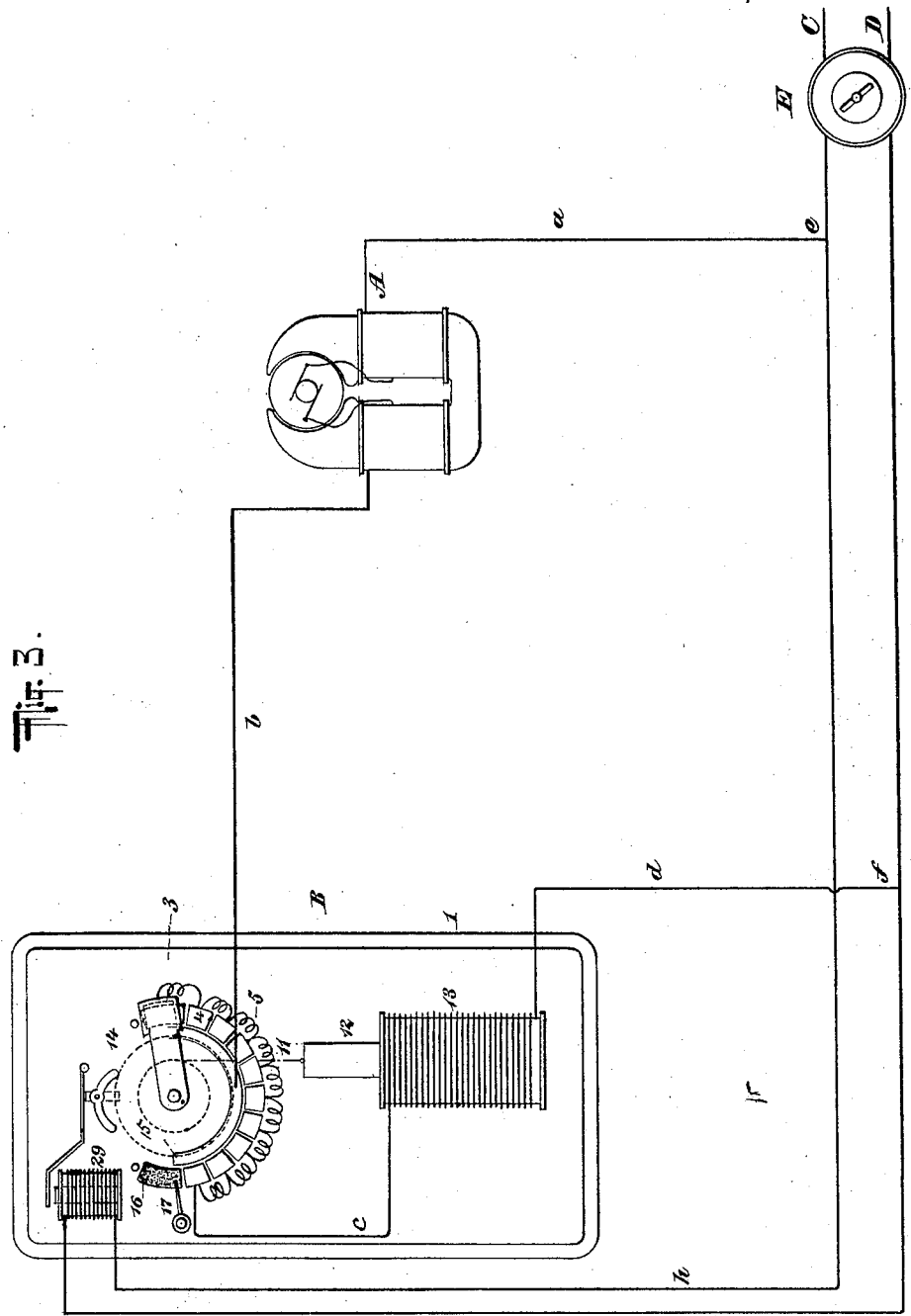
WITNESSES:
Gustave Dieterich
John Kehlenbeck
INVENTORS.
Felipe Vidal y Vilaret
David Belais
BY
Park Benjamin
their ATTORNEY.

UNITED STATES PATENT OFFICE.

FELIPE VIDAL Y VILARET AND DAVID BELAIS, OF NEW YORK, N. Y.

ELECTRIC-MOTOR REGULATOR.

SPECIFICATION forming part of Letters Patent No. 592,619, dated October 26, 1897.

Application filed May 24, 1897. Serial No. 637,867. (No model.)

*To all whom it may concern:*

Be it known that we, FELIPE VIDAL Y VILARET and DAVID BELAIS, of the city, county, and State of New York, have invented a new and useful Improvement in Electric-Motor Regulators, of which the following is a specification.

The invention is an electric-motor regulator so constructed that when the current is established in the motor resistance is automatically cut out of circuit, so that the strength of the current gradually increases, also so constructed as to automatically break circuit in the motor in event of short-circuiting or undue increase of current strength and automatically to adjust itself to variations in load on the motor.

Figure 1:
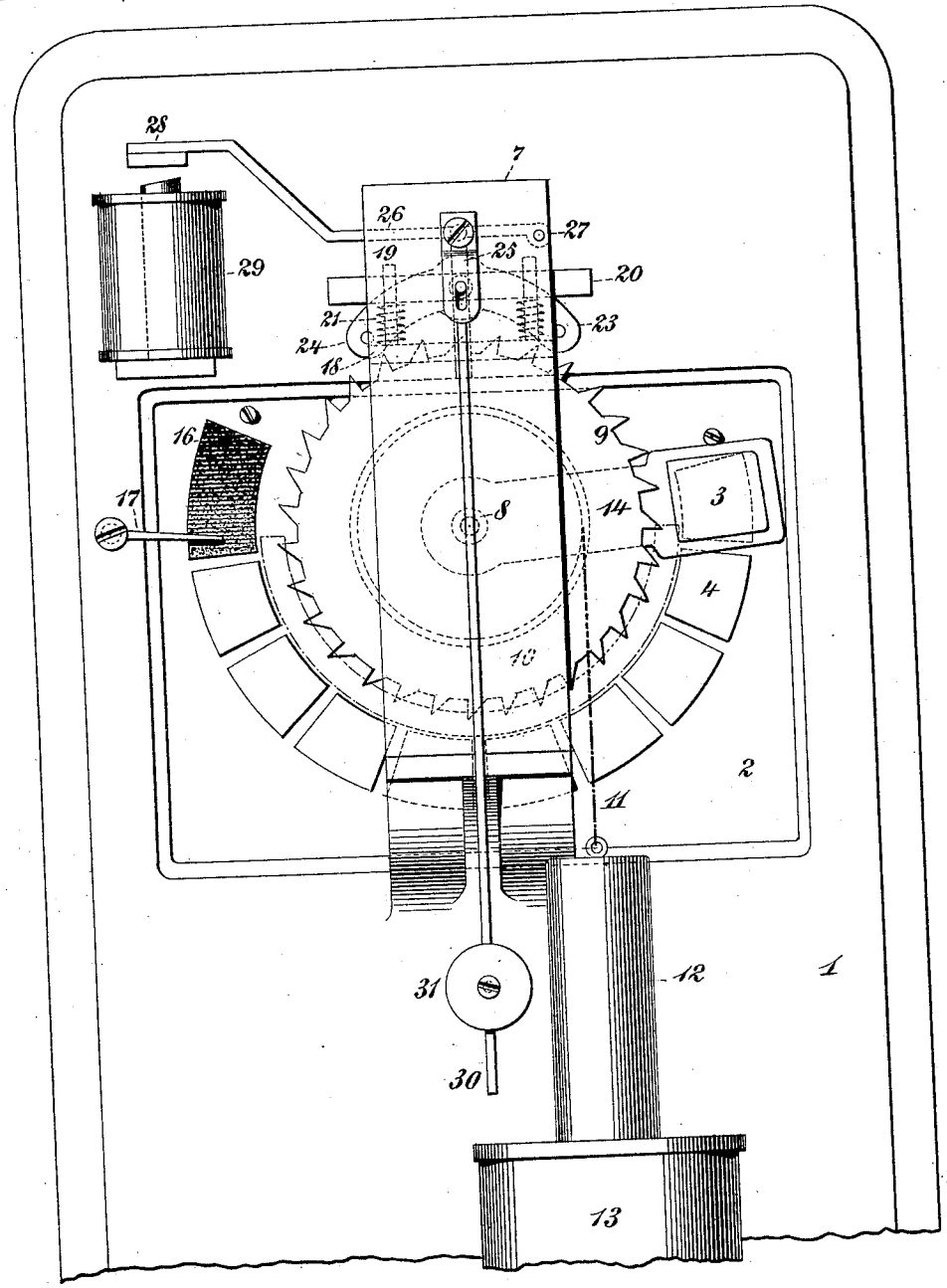
Figure 2:
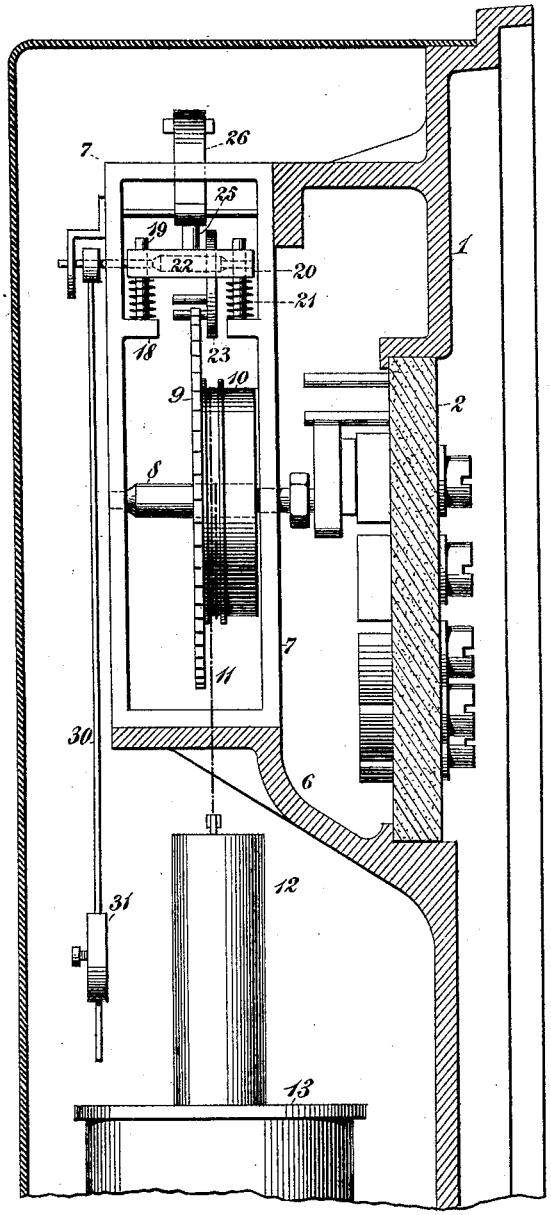

In the accompanying drawings, Figure 1 is a front elevation of our apparatus. Fig. 2 is a sectional side elevation thereof, and Fig. 3 is an electrical diagram showing the arrangement of the wiring.

Similar numbers and letters of reference indicate like parts.

Referring first to Fig. 3, A is an electric motor in series with the field-coils of which our regulator, which is represented at B, is included. C and D are feed-mains of the motor, and E is a switch of any suitable construction by means of which current is admitted to the motor and regulating apparatus at will.

The regulator is constructed as follows: 1 is a base or bed plate, having an inserted panel 2 of insulating material, upon which are arranged a number of metal contact-plates, as 3 4, &c., which plates are connected by resistance-coils 5 after the usual fashion of variable resistances. The base-plate 1 is provided with brackets 6, which support the frame 7, in which is journaled the arbor 8, carrying the toothed wheel 9. The arbor 8 also carries a drum 10, within which is a coiled spring and around which the cord 11 passes, which cord is connected to the free and moving core 12 of the solenoid 13. The arbor 8 also carries a contact-arm 14, the end of which in moving over its circular path makes successive contact with the contact-plates 3 4, &c.

Carried by the insulating-plate 2 is a circular continuous contact-plate 15, with which the arm 14 also makes contact. At the end of the series of contact-plates 3 4 is a contact-plate 16, which may be of carbon. This contact-plate is not connected with any of the resistance-coils. In passing upon the carbon plate 16 the arm 14 strikes a catch 17 and moves said catch aside in a manner hereinafter to be explained.

The frame 7 is provided with ledges 18, which support pins 19. These pins receive a cross-head 20. Between the cross-head and the ledges 18 are spiral springs 21. Pivoted in the cross-head 20 is an arbor 22, which carries a double pawl 23, having curved arms carrying pins 24, which are adapted to engage between the teeth of the wheel 9. The cross-head is also provided with an upwardly-extending pin 25, against which bears a lever 26. This lever is pivoted at 27 and is provided at its opposite end with an armature 28, which armature is in the field of the vertical electromagnet 29. The arbor 22 carries a pendulum-rod 30, having an adjustable knob or ball 31.

The circuits are as follows: from the controlling-switch E by wire *a* to the motor A, thence by wire *b* to the curved contact-bar 15, thence by arm 14 to one or more of the resistances included between the plates 3 4, &c., (depending upon the position of the arm,) and from the final plate of said series by wires *c* to solenoid 13, and thence by wire *d* to main wire D.

The electromagnet 29 is connected in shunt to the main circuit at the points *e f* by the wire *g h*.

The operation of the device is as follows: When the switch E is turned to admit full current to the motor, the solenoid 13 is energized and draws down its core 12. The drum 10 is thus rotated against the action of its contained coiled spring and the arm 14 is swept over the successive contact-plates 3 4, &c. This movement of contact-arm is regulated and made gradual by means of the toothed wheel 9 and double pawl 23, which operates as an escapement mechanism controlled by the pendulum-rod 30. Therefore the movement of the arm 14 over the successive contact-plates 3 4 being gradual its effect is to successively cut out the resistances 5. The amount of resistance cut out will be regulated by the volume of current which flows in the solenoid 13. Therefore, although the switch E may be suddenly thrown to admit the full current to the motor-circuit, the strength of the current in the motor is gradually increased up to the maximum by the automatic cutting out of resistances.

When there is no circuit on the apparatus, the spiral springs 21 raise the cross-head 20, and hence the armature-lever 26; but the instant current is established through the shunt $g\ h$ to magnet 29 that magnet attracts its armature 28, which acts upon the lever 26 and cross-head 20 and so brings the pawl into engagement with the toothed wheel 9, thus causing the pawl and toothed wheel 9 to form an escapement for the controlling contact-arm 14 in the manner already described.

In case of short-circuiting across the shunt including magnet 29 the amount of current passing into said magnet would become very small, and hence said magnet would release its armature and the springs 21 would raise the pawl 23 out of engagement with the toothed wheel 9. This wheel will then be free and it will be rapidly revolved by the drawing of the core 12 into the solenoid 13. The arm 14 will thus be carried around past the catch 17 and will come to rest upon the carbon contact 16, which is unconnected in the circuit. Consequently the circuit of the motor is thus broken and no damage will result from the short-circuiting.

The catch 17 may be a spring arranged to offer a definite resistance to the movement of arm 14, so that said arm will not pass upon the plate 16 until the increased strength in current becomes sufficient to enable it to overcome the opposition of the spring.

Return movement of the arm 14 is effected by the spring-barrel 10, so that the device will automatically adjust itself to variations in the load on the motor. When, however, the arm 14 has been moved past the spring-catch 17, the resistance of said catch is to be strong enough to prevent the retraction of the arm by spring-barrel 10. The arm 14 is thus kept in contact with plate 17 and the circuit so maintained open until the catch is caused no longer to hold the arm through manual interference of the attendant.

We claim—

1. In combination with an electric motor and in series circuit with the field thereof a variable resistance, means for automatically and gradually reducing said resistance, and means for automatically breaking said circuit upon a definite increase in current strength thereof, substantially as described.

2. The combination with an electric motor and a mechanical controlling device for regulating the same rate of resistance variation under different volumes of current, of means for varying the resistance in the field-circuit of said motor, and an electromagnetic device included in series in said circuit and actuating said means, substantially as described.

3. The combination with an electric motor of a series of resistances, a movable contact-arm and an electromagnetic device actuating said arm the said resistances, arm and electromagnetic device being in series in the field-circuit of said motor, and an escapement mechanism regulating the rate of movement of said arm, substantially as described.

4. The combination in an electric-motor regulator of a series of resistances, a movable contact-arm coöperating with said resistances to cut one or more of them into or out of the circuit of said motor, an electromagnet actuating said arm in one direction and included in said circuit, a mechanism for regulating the rate of movement of said arm, and means actuated by a definite variation in the current on said circuit for releasing said arm from the control of said regulating mechanism, substantially as described.

5. The combination in an electric-motor regulator of a series of resistances, a movable contact-arm coöperating therewith to cut one or more of them into or out of circuit an electromagnetic device actuating said arm and in circuit with said resistances, mechanism for regulating the movement of said arm, and a second electromagnetic device operating to release said arm from the control of said regulating mechanism upon definite current variation on the circuit, substantially as described.

6. The combination in an electric-motor regulator of a series of resistances, a movable contact-arm coöperating with said resistances to cut one or more of them into or out of circuit, an electromagnet actuating said arm, a pawl and toothed wheel, mechanism for regulating the rate of movement of said arm, and an electromagnet controlling said pawl to engage with said mechanism, substantially as described.

7. The combination in an electric-motor regulator of the solenoid 13, arm 14 controlled thereby, contact-plates as 3, 4 and interposed resistances 5 coöperating with said arm, the said contact-plates, resistances, arm and solenoid being in series circuit, and contact-plate 16, the aforesaid parts being constructed and arranged so that said arm after being carried by the action of said solenoid successively over contact-plates 3, 4, &c., to cut resistances out of the circuit, shall rest on contact-plate 16, substantially as described.

8. The combination in an electric-motor regulator of the solenoid 13, arm 14 controlled thereby, contact-plates as 3, 4, and interposed resistances 5 coöperating with said arm, the said contact-plates, resistances, arm and solenoid being in series circuit, contact-plate 16, and catch 17; the aforesaid parts being constructed and arranged so that said arm after being carried by the action of said solenoid successively over contact-plates 3, 4, &c., to cut resistances out of circuit, shall upon certain definite increase in current strength overcome the mechanical resistance of catch 17 and pass upon contact-plate 16, substantially as described.

FELIPE VIDAL Y VILARET.
  DAVID BELAIS.

Witnesses:
 J. A. VAN WART,
 H. R. MOLLER.